United States Patent
Nagy

(10) Patent No.: US 6,982,305 B2
(45) Date of Patent: Jan. 3, 2006

(54) OLEFIN POLYMERIZATION IN THE PRESENCE OF A DEHYDROGENATION CATALYST

(75) Inventor: Sandor Nagy, Naperville, IL (US)

(73) Assignee: Equistar Chemicals, LP, Houston, TX (US)

(*) Notice: Subject to any disclaimer, the term of this patent is extended or adjusted under 35 U.S.C. 154(b) by 93 days.

(21) Appl. No.: 10/764,941

(22) Filed: Jan. 26, 2004

(65) Prior Publication Data

US 2005/0165180 A1   Jul. 28, 2005

(51) Int. Cl.
  *C08F 4/60* (2006.01)
  *C08F 4/64* (2006.01)
  *C08F 4/70* (2006.01)

(52) U.S. Cl. .............. 526/115; 526/113; 526/114; 526/117; 526/118; 526/119; 526/169.1; 526/172; 526/160; 526/161

(58) Field of Classification Search .......... 526/113, 526/114, 115, 117, 118, 119, 160, 161, 169.1, 526/172
See application file for complete search history.

(56) References Cited

U.S. PATENT DOCUMENTS

| | | | |
|---|---|---|---|
| 3,903,191 A | 9/1975 | Pollitzer | 260/683.3 |
| 5,064,802 A | 11/1991 | Stevens et al. | 502/155 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,539,124 A | 7/1996 | Etherton et al. | 548/402 |
| 5,637,659 A | 6/1997 | Krishnamurti et al. | 526/133 |
| 5,648,440 A | 7/1997 | Sugano et al. | 526/132 |
| 5,780,701 A | 7/1998 | Kaska et al. | 585/654 |
| 5,902,866 A | 5/1999 | Nagy et al. | 526/133 |
| 6,294,495 B1 | 9/2001 | Matsunaga | 502/103 |
| 6,586,541 B2 | 7/2003 | Citron | 526/113 |

OTHER PUBLICATIONS

C. Jensen, Chem. Commun. (1999) 2443-2449.
March, *Advanced Organic Chemistry* 3rd. ed. (1985) 1053.
B. Weckhuysen et al., *Catalysis Today 51*, (1999) 223.
R. Crabtree et al., *J. Am. Chem. Soc. 104*, (1982) 107.
M. Burk, et al., *J. Am. Chem. Soc. 109*, (1987) 8025.
M. Burk, et al.,*J. Chem. Soc., Chem. Commun.* (1985) 1829.
J. Belli, et al., *Organometallics 15*, (1996) 1532.
C. Moulton et al., *J. Chem. Soc., Dalton Trans.* (1976) 1020.
M. Albrecht et al., *Angew. Chem. Int. Ed. 40* (2001) 3751.
J. Singleton, *Tetrahedron 59* (2003) 1837.
C. Jensen et al., *Chem. Commun.* (1997) 461.
K. Krogh-Jespersen et al., *J. Mol. Catal. A 189* (2002) 95.
C. Jensen, *Chem. Commun.* (1999) 2443.
M. Burk et al., *Organometallics 3* (1984) 816.
J. Maguire et al., *J. Am. Chem. Soc. 113* (1991) 6706.
J. Miller et al., *J. Chem. Soc. Chem. Commun.* (1994) 1449.
D. Baudry et al.,*J. Chem. Soc., Chem. Commun.* (1983) 788.
T. Sakakura et al., *Chem. Letters* (1988) 263.
M Gupta et al., *J. Am. Chem. Soc. 119* (1997) 840.

*Primary Examiner*—Roberto Rabago
(74) *Attorney, Agent, or Firm*—John Tyrell; Jonathan L. Schuchardt

(57) ABSTRACT

A process for polymerizing olefins is disclosed. The process polymerizes an olefin in the presence of a dehydrogenation catalyst and an olefin polymerization catalyst. The dehydrogenation catalyst enables in-situ generation of alkenes from oligomers or solvent. The alkenes are then incorporated into the polyolefin. The polyolefin should have increased long-chain branching and lower density without the use of expensive comonomers.

18 Claims, No Drawings

OLEFIN POLYMERIZATION IN THE PRESENCE OF A DEHYDROGENATION CATALYST

FIELD OF THE INVENTION

The invention relates to a process for making polyolefins. The process polymerizes olefins in the presence of a dehydrogenation catalyst and an olefin polymerization catalyst.

BACKGROUND OF THE INVENTION

While Ziegler-Natta catalysts are a mainstay for polyolefin manufacture, single-site (metallocene and non-metallocene) catalysts represent the industry's future. These catalysts are often more reactive than Ziegler-Natta catalysts, and they produce polymers with improved physical properties. The improved properties include narrow molecular weight distribution, reduced low molecular weight extractables, enhanced incorporation of α-olefin comonomers, lower polymer density, controlled content and distribution of long-chain branching, and modified melt rheology and relaxation characteristics.

Single-site olefin polymerization catalysts having "open architecture" are generally known. Examples include the so-called "constrained geometry" catalysts developed by scientists at Dow Chemical Company (see, e.g., U.S. Pat. No. 5,064,802), which have been used to produce a variety of polyolefins. "Open architecture" catalysts differ structurally from ordinary bridged metallocenes, which have a bridged pair of pi-electron donors. In open architecture catalysts, only one group of the bridged ligand donates pi electrons to the metal; the other group is sigma bonded to the metal. An advantage of this type of bridging is thought to be a more open or exposed locus for olefin complexation and chain propagation when the complex becomes catalytically active. Simple examples of complexes with open architecture are tert-butylamido(cyclopentadienyl)dimethylsilylzirconium dichloride and methylamido(cyclopentadienyl)-1,2-ethanediyltitanium dimethyl:

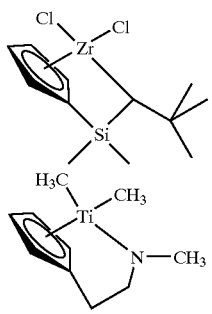

While improvements in long-chain branching and comonomer incorporation have been achieved versus Ziegler-Natta processes, there is a need for further improvements. With the currently available systems, the amount of long-chain branching is small and addition of comonomer adds to the cost.

Dehydrogenation catalysts form the basis for such processes as the manufacture of styrene from ethylbenzene. See March, *Advanced Organic Chemistry* 3$^{rd}$ ed. (1985) Wiley, NY, p. 1053 for a brief discussion of dehydrogenation. Commonly, dehydrogenation catalysts are similar to or the same as hydrogenation catalysts since the dehydrogenation reaction is the reverse of hydrogenation. Platinum, palladium, and nickel are common, and the reactions proceed only at very high temperatures (in excess of 300° C.) since the dehydrogenation is highly endothermic. The dehydrogenation of ethylbenzene is performed at about 620° C. over catalysts which primarily consist of iron oxide and potassium salt promoters. For some other typical examples of high-temperature catalytic dehydrogenation, see U.S. Pat. No. 3,903,191 (uses greater than 800° F.) or *Catal. Today* 51 (1999) 223 (chromium oxide on alumina; >580° C.).

During the 1980s, Professor Robert Crabtree and others discovered that certain iridium complexes are capable of catalytically dehydrogenating alkanes to alkenes under exceptionally mild thermal (i.e., less than 160° C.) or even photolytic conditions (see, e.g., *J. Am. Chem. Soc.* 104 (1982) 107; 109 (1987) 8025; *J. Chem. Soc., Chem. Commun.* (1985) 1829). For a more recent example, see *Organometallics* 15 (1996) 1532.

In addition, "pincer" complexes of platinum-group metals have been known since the late 1970s (see, e.g., *J. Chem. Soc., Dalton Trans.* (1976) 1020). Pincer complexes have a metal center and a pincer skeleton. The pincer skeleton is a tridentate ligand that is connected to the metal via at least one metal-carbon sigma bond; substituents ortho to this sigma bond are held in a fixed position and can coordinate to the metal site. The use of pincer complexes in organic synthesis, including their use as low-temperature alkane dehydrogenation catalysts, was exploited during the 1990s and is the subject of two excellent review articles (see *Angew. Chem. Int. Ed.* 40 (2001) 3751 and *Tetrahedron* 59 (2003). See also U.S. Pat. No. 5,780,701. Jensen et al. (*Chem. Commun.* 1997 461) used iridium pincer complexes to dehydrogenate ethylbenzene to styrene at 150 to 200° C. Recently, pincer complexes have been developed that dehydrogenate hydrocarbons at even lower temperatures. For some recent examples, see *J. Mol. Catal. A* 189 (2002) 95, 111 and *Chem. Commun.* (1999) 2443.

Polymerization catalysts based upon Group 4–9 first or second row transition metals having tridentate ligands are disclosed in U.S. Pat. No. 6,294,495. The tridentate ligands can be pincer ligands, but the use of dehydrogenation catalysts is not disclosed. The only complexes disclosed are polymerization catalysts.

Despite the extensive research into new methods to prepare polyolefins, no one has apparently contemplated polymerizing olefins in the presence of both an olefin polymerization catalyst and a low-temperature dehydrogenation catalyst. On the other hand, in-situ dehydrogenation would generate alkenes readily available for incorporation into a growing polyolefin chain.

SUMMARY OF THE INVENTION

The invention is a process for making polyolefins. The process comprises polymerizing an olefin in the presence of a low-temperature, platinum-group dehydrogenation catalyst, an olefin polymerization catalyst, and an optional hydrocarbon solvent. The unique reaction conditions promote: (i) olefin polymerization; (ii) catalytic dehydrogenation of the solvent and/or the resulting saturated oligomer or polymer chains to produce short and/or long-chain alkenes; and (iii) copolymerization of additional olefin with the alkenes. The resulting polyolefin product has long-chain branching and/or a density less than about 0.96 g/cm$^3$.

Including a dehydrogenation catalyst in the polymerization enables in-situ production of alkenes, including unsaturated oligomer or polymer chains. When the dehydrogenation product is a long-chain alkene such as would be prepared by dehydrogenating an olefin oligomer, incorporation provides a polyolefin with long-chain branching. This can be useful for improving certain polyolefin properties such as tear strength. When the alkene is a short-chain alkene (e.g., derived from dimers, trimers, or a hydrocarbon polymerization solvent), the incorporated alkene reduces polymer density without the need for expensive comonomers.

DETAILED DESCRIPTION OF THE INVENTION

In the process of the invention, an olefin is polymerized in the presence of a dehydrogenation catalyst and an olefin polymerization catalyst.

The dehydrogenation catalyst is a low-temperature, platinum-group catalyst. The catalyst must be capable of removing hydrogen from an alkane or substituted alkane, i.e., effecting "dehydrogenation." Suitable platinum-group metals include platinum, palladium, rhodium, ruthenium, osmium, and iridium. Also suitable, though not strictly "platinum group" metals, are nickel and rhenium. Preferably, the dehydrogenation catalyst contains iridium or rhodium. More preferably, the dehydrogenation catalyst contains iridium. The catalysts are "low-temperature" dehydrogenation catalysts, meaning that they are capable of effecting the desired dehydrogenation reaction at temperatures commonly used to polymerize olefins. Preferably, the catalysts are effective at less than 300° C., more preferably less than 200° C., and most preferably from about room temperature to about 160° C. This contrasts with conventional dehydrogenation catalysts, which are normally effective only at much higher temperatures (>400° C.).

Suitable catalysts include the platinum-group metal, non-pincer complexes that are now well known in the art for effecting thermal or photolytic catalytic dehydrogenations at temperatures below about 160° C. These include the Rh, Re, and Ir complexes described in *Organometallics* 15 (1996) 1532; 3 (1984) 816; *J. Am. Chem. Soc.* 113 (1991) 6706; 109 (1987) 8025; 104 (1982) 107; *J. Chem. Soc. Chem. Commun.* (1994) 1449; (1985) 1829; (1983) 788; and *Chem. Letters* (1988) 263, and references cited therein.

Pincer complexes are preferred dehydrogenation catalysts. Suitable pincer complexes have a tridentate ligand that is connected to the metal via at least one metal-carbon sigma bond; substituents ortho to this sigma bond are held in a fixed position and can coordinate to the metal site. Suitable complexes appear in *Angew. Chem. Int. Ed.* 40 (2001) 3751 and *Tetrahedron* 59 (2003) and references cited therein. Additional examples of suitable pincer complexes appear in U.S. Pat. No. 5,780,701, the teachings of which are incorporated herein by reference. Other suitable pincer complexes are described in Chem. Commun. (1997) 461; (1999) 2443; *J. Mol. Catal. A* 189 (2002) 95, 111; and *J. Am. Chem. Soc.* 119 (1997) 840.

A preferred class of low-temperature dehydrogenation catalysts contains iridium and preferably has the general structure:

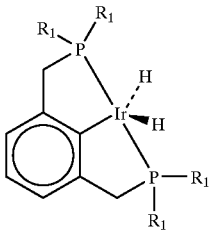

wherein $R_1$ is a $C_1$–$C_{30}$ hydrocarbyl radical.

These compounds can be conveniently prepared from the reaction of iridium trichloride and the diphosphine as described in *J. Chem. Soc. Dalton Trans.* (1976) 1020. The hydrochloride complex can be reacted with hydrogen and lithium triethylborohydride to prepare the dihydrido iridium pincer complex as described in *J. Am. Chem. Soc.* 119 (1997) 840. This sequence is illustrated below:

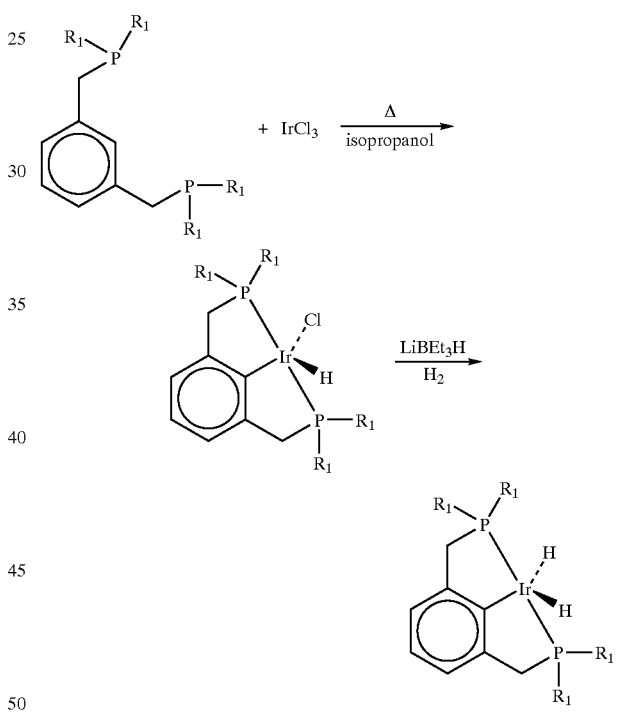

The olefin polymerization catalyst can be any catalyst system that polymerizes olefins, including Ziegler-Natta or single-site catalysts. Preferably, the olefin polymerization catalyst is a single-site catalyst which comprises an activator and an organometallic complex, wherein the organometallic complex comprises a Group 3 to 10 transition metal and at least one polymerization-stable anionic ligand bonded to the transition metal. The polymerization-stable anionic ligand is preferably selected from the group consisting of cyclopentadienyl, indenyl, fluorenyl, and indenoindolyl ligands, More preferred complexes include a Group 4 transition metal such as titanium or zirconium. Preferably, the organometallic complex has open architecture. When the organometallic complex has open architecture, preferably it has the general structure:

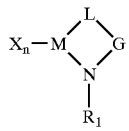

in which M is a Group 4–6 transition metal, L is a polymerization-stable anionic ligand, G is a linking group, $R_1$ is $C_1$–$C_{20}$ hydrocarbyl, X is alkyl, aryl, alkoxy, aryloxy, halide, dialkylamino, or siloxy, and n satisfies the valence of M. More preferably, M is a Group 4 transition metal, G is dialkylsilyl, and X is halide or alkyl.

Exemplary organometallic complexes useful for the process of the invention:

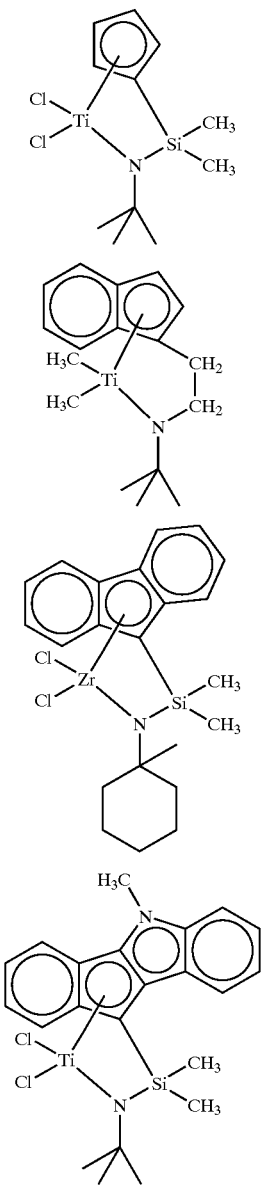

Preferably, the organometallic complex has the structure:

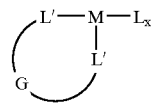

wherein M is a Group 3 to 10 transition metal; each L is independently selected from the group consisting of halide, alkoxy, aryloxy, siloxy, alkylamino, and $C_1$–$C_3$ hydrocarbyl; each L' is independently selected from the group consisting of alkylamido, substituted or unsubstituted cyclopentadienyl, fluorenyl, indenyl, boraaryl, pyrrolyl, azaborolinyl, and indenoindolyl; G is a linking group and x satisfies the valence of M. Preferably, G is a divalent radical selected from the group consisting of hydrocarbyl and heteroatom-containing alkylene radicals, diorganosilyl radicals, diorganogermanium radicals, and diorganotin radicals. Preferably, one L' is alkylamido and the other L' is selected from the group consisting of substituted or unsubstituted cyclopentadienyl, fluorenyl, indenyl, and indenoindolyl.

In another preferred aspect, the organometallic complex has the general structure:

wherein M is a Group 3 to 10 transition metal; each L is independently selected from the group consisting of halide, alkoxy, aryloxy, siloxy, alkylamino, and $C_1$–$C_{30}$ hydrocarbyl; each L' is independently selected from the group consisting of alkylamido, substituted or unsubstituted cyclopentadienyl, fluorenyl, indenyl, boraaryl, azaborolinyl, and indenoindolyl; n is 1 or 2 and x satisfies the valence of M.

The activator helps to ionize the organometallic complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethyl aluminum chloride, trimethylaluminum, triisobutyl aluminum), and the like. Suitable activators include acid salts that contain non-nucleophilic anions. These compounds generally consist of bulky ligands attached to boron or aluminum, and particularly include ionic borates and ionic aluminates. Examples include lithium tetrakis(pentafluorophenyl)borate, lithium tetrakis(pentafluorophenyl)Application/Control aluminate, anilinium tetrakis(pentafluorophenyl)borate, trityl tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates-reaction products of alkyl aluminum compounds and organoboronic acids as described in U.S. Pat. No. 5,414,180 and U.S. Pat. No. 5,648,440, the teachings of which are incorporated herein by reference. Alumoxane activators, such as MAO, are preferred.

The optimum amount of activator needed relative to the amount of organometallic complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of transition metal, M. When the activator is an organoborane or an ionic borate or aluminate, the amount used will be within the range of about 0.01 to about 5000 moles, preferably from about 0.1 to about 10 moles, of activator per mole of M. The activator can be combined with the complex and added to the reactor as a mixture, or the components can be added to the reactor separately.

Optionally, the complex is supported. The support material is preferably a porous material such as inorganic oxides and chlorides, and organic polymer resins. Preferred inorganic oxides include oxides of Group 2, 3, 4, 5, 13, or 14 elements. Preferred supports include silica, alumina, silica-aluminas, magnesias, titania, zirconia, magnesium chloride, and crosslinked polystyrene. Most preferably, the support is silica.

The process is preferably performed under thermal conditions. However, photolytic conditions or a combination of thermal and photolytic conditions can be used depending upon the choice of dehydrogenation catalyst. As noted earlier, some dehydrogenation catalysts are activated photochemically (see, e.g., *Chem. Letters* (1988) 263) while others are advantageously used under the typical thermal conditions of an olefin polymerization (see, e.g., *J. Am. Chem. Soc.* 109 (1987) 8025.

Preferred olefins for the polymerization are ethylene and $C_3$–$C_{20}$ α-olefins such as propylene, 1-butene, 1-pentene, 1-hexene, 1-octene, and the like. Mixtures of olefins can be used. Ethylene and mixtures of ethylene with $C_3$–$C_{10}$ α-olefins are especially preferred.

Preferred processes are slurry, bulk, solution, and gas-phase processes. A slurry or gas-phase process is preferably used. Suitable methods for polymerizing olefins are described, for example, in U.S. Pat. Nos. 5,902,866, 5,637,659, and 5,539,124, the teachings of which are incorporated herein by reference.

The polymerizations can be performed over a wide temperature range, such as about −30° C. to about 280° C. A more preferred range is from about 30° C. to about 250° C. even more preferably from about 30° C. to about 160° C. Most preferred is the range from about 60° C. to about 100° C. Olefin partial pressures normally range from about 0.1 MPa to about 350 MPa. More preferred is the range from about 0.1 MPa to about 7 MPa.

The dehydrogenation catalyst enables in-situ production of short and/or long-chain alkenes, which can incorporate into the polyolefin. When the dehydrogenation product is a long-chain alkene such as would be prepared by the dehydrogenation of an olefin oligomer, incorporation should give a polyolefin with long-chain branching. As an example of long-chain branching, if an oligomer of ethylene containing 50 repeat units (100 carbons) were dehydrogenated to an olefin with 100 carbons and then incorporated into a polyethylene chain, the branch whould be 98 carbon units long.

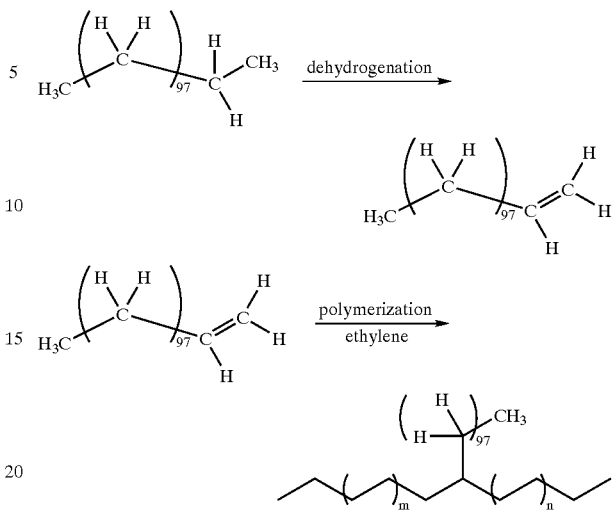

When the alkene is a short-chain alkene, such as may be prepared from olefin dimers or trimers or from polymerization solvents, the incorporated alkene should reduce polymer density without the need for expensive comonomers. As an example of solvent incorporation, if hexane were used as the solvent, the dehydrogenation catalyst would convert some of the hexane to 1-hexene, which should then incorporate into the polyethylene chain.

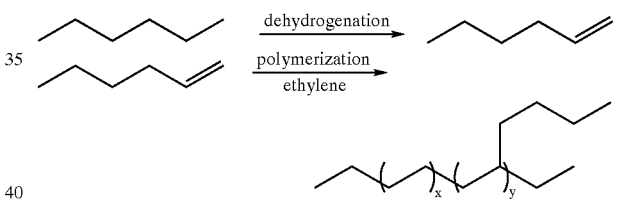

If incorporation of alkenes generated from the solvent is desired, a solution or slurry process is preferable. If it is desired to minimize incorporation of alkenes generated from the solvent, a gas-phase process is preferred. All three types of polymerization should enable long-chain branching by incorporation of alkenes from the dehydrogenation of saturated polymer chains (e.g., ethylene oligomers).

The following examples merely illustrate the invention. Those skilled in the art will recognize many variations that are within the spirit of the invention and scope of the claims.

Preparation of Open Architecture Complex 4

(a) Preparation of Indeno[1,2-b]indole 1

A mixture of 1-indanone (30.6 g, 232 mmol) and p-tolylhydrazine hydrochloride (37.0 g, 233 mmol) in ethanol (350 mL) and aqueous HCl (12 N, 18 mL) are heated to reflux for 90 minutes. The mixture is cooled and filtered, and the solid is washed with ethanol (600 mL) followed by 20% aqueous ethanol (400 mL) and finally hexanes (200 mL). The off-white solid is dried under vacuum (36.5 g, 72%).

(b) N-Methylation of 1. A mixture of 1 (36.5 g, 166 mmol), aqueous NaOH solution (112 mL, 20 M, 2.2 mol), $C_{16}H_{33}NMe_3Br$ (0.65 g, 1.78 mmol), and toluene (112 mL) is vigorously stirred at room temperature. A solution of methyl iodide (17.0 mL, 273 mmol) in toluene (15 mL) is added dropwise, and the mixture is stirred at room temperature for 4 hours and refluxed for 3 hours. A crystalline solid forms upon cooling and is filtered and washed with cold (−78° C.) ethanol (300 mL) followed by hexanes (100 mL). The layers are separated and the aqueous fraction is washed with toluene (2×100 mL). The organics are combined and dried over $Na_2SO_4$ and filtered. The volatiles are removed under vacuum and the precipitate is dried and combined with the crystalline product 2 (total yield 25.7 g, 66%).

(c) Bridged ligand preparation (3)

n-Butyllithium (8 mL, 2.5 M in hexane, 20 mmol) is added dropwise to a solution of 2 (4.66 g, 21 mmol) in dry ether (70 mL). After 2 h, this solution is slowly added to a solution of dichlorodimethylsilane (5.20 g) in ether (30 mL). After 2 hours of stirring at room temperature, the mixture is filtered and evaporated. The residue is redissolved in ether (60 mL), and an ethereal solution of lithium t-butylamide (prepared in the usual manner from t-butylamine (1.46 g) and n-butyllithium (8 mL of 2.5 M solution)) is added dropwise. The mixture is stirred for 3 hours, and is then filtered through Celite filter aid. After concentrating the filtrate, the residue is collected with pentane and chilled to −30° C. Yield of bridged ligand 3:6 g (82%).

(d) Preparation of open architecture complex 4

Bridged ligand 3 (6 g) is dissolved in ether (120 mL) and n-butyllithium (13.5 mL of 2.5 M solution in hexane) is added. After stirring overnight at room temperature, methyllithium (24.5 mL of 1.4 M solution in ether) is added, and the mixture is cooled to −30° C. Titanium tetrachloride bis(tetrahydrofuran) complex (5.66 g) is added, and stirring continues for 3 hours. The mixture is filtered and the filtrate is concentrated. The residue is extracted with hot heptane (2×100 mL). The combined filtrates are evaporated, and the residue is crystallized with pentane and cooled to −30° C. The product, complex 4, is a dark brown solid. Yield: 4.67 g.

The $^1H$ NMR spectrum is consistent with the proposed structure:

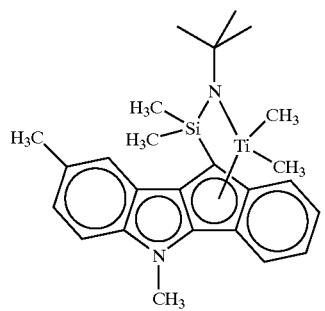

4

Preparation Of Dehydrogenation Catalyst 6

(a) Preparation of iridium complex 5

A mixture of 1,3-bis[(di-t-butylphosphino)methyl] benzene (1.44 g, 3.63 mmol), hydrated iridium (III) chloride (0.65 g, 1.82 mmol) in water (2 mL), and 2-propanol (15 mL) is heated under reflux for 20 hours. The mixture is cooled to −5° C. and the product separated. The crude product is recrystallized from petroleum ether.

(b) Preparation of dehydrogenation catalyst 6

To 0.5 g (0.8 mmol) 5 in 100 mL pentane, 25 mL of a 1.0 M solution of lithium triethylborohydride in tetrahydrofuran is added over a period of 10 minutes and the reaction placed under a hydrogen atmosphere of 0.1 Mpa. Stirring is continued at room temperature for 6 hours and a white solid is isolated. The solid is heated under vacuum at 130° C. for three hours. The expected product is dehydrogenation catalyst 6.

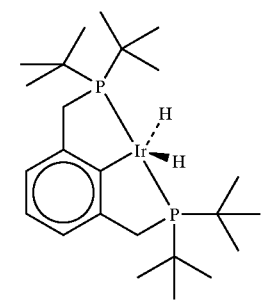

6

EXAMPLE 1

Polymerization of Ethylene

A 20-mL steel vessel equipped with a 15-mL glass liner is charged with 4.5 mL hexane, complex (0.1 mL of 0.5 mM solution of complex 4 in hexane), dehydrogenation catalyst (0.1 mL of 0.5 mM solution of dehydrogenation catalyst 6 in toluene), and 0.1 mL of 1.95 M methylalumoxane in hexane. The vessel is heated to 80° C. and ethylene fed to the vessel to maintain 2.1 MPa. The polymerization proceeds for one hour. The reactor is vented, and methanol is added. The solvent is evaporated and the polyolefin is collected and dried prior to testing. The density of the polymer is expected to be less than 0.95 g/cm³ due to incorporation of hexene and due to long-chain branching.

The preceding example is meant only as illustration. The following claims define the invention.

I claim:

1. A process which comprises polymerizing an olefin in the presence of: (a) a single-site or Ziegler-Natta olefin polymerization catalyst; (b) a low-temperature dehydrogenation catalyst comprising a metal selected from the group consisting of platinum, palladium, rhodium, ruthenium, osmium, iridium, nickel, and rhenium; and (c) an optional hydrocarbon solvent, under conditions effective to promote:

(i) olefin polymerization;
   (ii) catalytic dehydrogenation of the solvent and/or the resulting saturated oligomer or polymer chains to produce short and/or long-chain alkenes; and
   (iii) copolymerization of additional olefin with the alkenes; to produce a polyolefin having long-chain branching and/or a density less than about 0.96 g/cm³.

2. The process of claim 1 wherein the dehydrogenation catalyst comprises iridium.

3. The process of claim 1 wherein the dehydrogenation catalyst is a pincer complex.

4. The process of claim 3 wherein the dehydrogenation catalyst has the general structure:

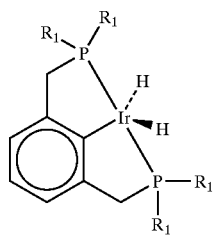

in which each $R_1$ is independently a $C_1$–$C_{30}$ hydrocarbyl radical.

5. The process of claim 1 wherein the olefin polymerization catalyst comprises an activator and an organometallic complex, wherein the organometallic complex comprises a Group 3 to 10 transition metal, M, and at least one polymerization-stable anionic ligand that is bonded to M.

6. The process of claim 5 wherein the organometallic complex has open architecture.

7. The process of claim 5 wherein the organometallic complex has the general structure:

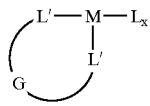

wherein M is a Group 3 to 10 transition metal; each L is independently selected from the group consisting of halide, alkoxy, aryloxy, siloxy, alkylamino, and $C_1$–$C_{30}$ hydrocarbyl; each L' is independently selected from the group consisting of alkylamido, substituted or unsubstituted cyclopentadienyl, fluorenyl, indenyl, boraaryl, pyrrolyl, azaborolinyl, and indenoindolyl; G is a linking group and x satisfies the valence of M.

8. The process of claim 7 wherein G is a divalent radical selected from the group consisting of hydrocarbyl and heteroatom-containing alkylene radicals, diorganosilyl radicals, diorganogermanium radicals, and diorganotin radicals.

9. The process of claim 8 wherein one L' is alkylamido and the other L' is selected from the group consisting of substituted or unsubstituted cyclopentadienyl, fluorenyl, indenyl, and indenoindolyl.

10. The process of claim 5 wherein the polymerization-stable anionic ligand is selected from the group consisting of cyclopentadienyl, indenyl, fluorenyl, and indenoindolyl ligands.

11. The process of claim 5 wherein the Group 3 to 10 transition metal is a Group 4 transition metal.

12. The process of claim 5 wherein the activator is selected from the group consisting of alumoxanes, alkylaluminum compounds, organoboranes, ionic borates, ionic aluminates, aluminoboronates, and mixtures thereof.

13. The process of claim 5 wherein the organometallic complex has the general structure:

wherein M is a Group 3 to 10 transition metal; each L is independently selected from the group consisting of halide, alkoxy, aryloxy, siloxy, alkylamino, and $C_1$–$C_{30}$ hydrocarbyl; each L' is independently selected from the group consisting of alkylamido, substituted or unsubstituted cyclopentadienyl, fluorenyl, indenyl, boraaryl, azaborolinyl, and indenoindolyl; n is 1 or 2 and x satisfies the valence of M.

14. The process of claim 1 wherein the olefin is selected from the group consisting of ethylene, propylene, 1-butene, 1-pentene, 1-hexene, 1-octene, and mixtures thereof.

15. The process of claim 1 wherein the olefin is ethylene.

16. The process of claim 1 wherein the polymerization is performed at a temperature within the range of about 30° C. to about 250° C.

17. The process of claim 1 wherein the polymerization is performed at a temperature within the range of about 30° C. to about 160° C.

18. A gas-phase, slurry, or solution process of claim 1.

* * * * *